United States Patent
Kim et al.

(10) Patent No.: US 8,302,674 B2
(45) Date of Patent: Nov. 6, 2012

(54) AIR CONDITIONING SYSTEM FOR CAR

(75) Inventors: Jae-Ho Kim, Daejeon (KR); Yong-Jun Jee, Daejeon (KR); Seong-Seok Han, Daejeon (KR)

(73) Assignee: Halla Climate Control Corp. (KR)

( * ) Notice: Subject to any disclaimer, the term of this patent is extended or adjusted under 35 U.S.C. 154(b) by 1312 days.

(21) Appl. No.: 11/989,949

(22) PCT Filed: May 8, 2006

(86) PCT No.: PCT/KR2006/001721
§ 371 (c)(1),
(2), (4) Date: Feb. 4, 2008

(87) PCT Pub. No.: WO2006/121274
PCT Pub. Date: Nov. 16, 2006

(65) Prior Publication Data
US 2009/0032216 A1  Feb. 5, 2009

(30) Foreign Application Priority Data
May 9, 2005  (KR) .................. 10-2005-0038439

(51) Int. Cl.
*B60H 1/32* (2006.01)

(52) U.S. Cl. .............. 165/202; 165/42; 165/43; 165/95; 165/119; 62/303; 454/75; 454/156; 454/157; 454/158; 454/160; 454/161; 55/309; 55/309.1; 55/312; 55/328; 55/392; 55/392.1; 55/393; 55/422

(58) Field of Classification Search ............ 165/202, 165/42, 43, 119, 95, 303; 454/75, 156, 160, 454/158, 161, 157; 55/309, 309.1, 312, 422, 55/328, 392, 392.1, 393; 62/303
See application file for complete search history.

(56) References Cited

U.S. PATENT DOCUMENTS

2003/0186643 A1 * 10/2003 Feuillard et al. .............. 454/157
2007/0175622 A1    8/2007 Jee et al.

FOREIGN PATENT DOCUMENTS

| FR | 2833532 | A1 | * | 6/2003 |
| JP | 59089213 | A | * | 5/1984 |
| JP | 61-135820 | | | 6/1986 |
| JP | 62-124015 | | | 8/1987 |
| JP | 02231222 | A | * | 9/1990 |
| JP | 05201245 | A | * | 8/1993 |
| JP | 2001-163029 | | | 6/2001 |
| JP | 2001-163049 | | | 6/2001 |
| JP | 2001163029 | A | * | 6/2001 |
| JP | 2001263784 | A | * | 9/2001 |
| KR | 2002064035 | A | * | 8/2002 |

* cited by examiner

*Primary Examiner* — John Ford
(74) *Attorney, Agent, or Firm* — Lowe Hauptman Berner & Ham LLP

(57) ABSTRACT

An air conditioning system, which can automatically remove a malodor generated due to condensate water remaining in an evaporator during a predetermined period of time after operation of an air conditioner or turning-off of the air conditioner and control a filtering mode time of a filter to filter an air. The air conditioning system characteristically comprises a shiftable deodorization filter (30 or 40) located on a flow channel of the cool air passageway and operationally moved to a filtering mode position so as to screen the flow channel of the cool air passageway during a predetermined period of time after an air conditioner is turned on or off, whereby the air passing through the cool air passageway C and a malodor contained in the air are filtered.

12 Claims, 13 Drawing Sheets

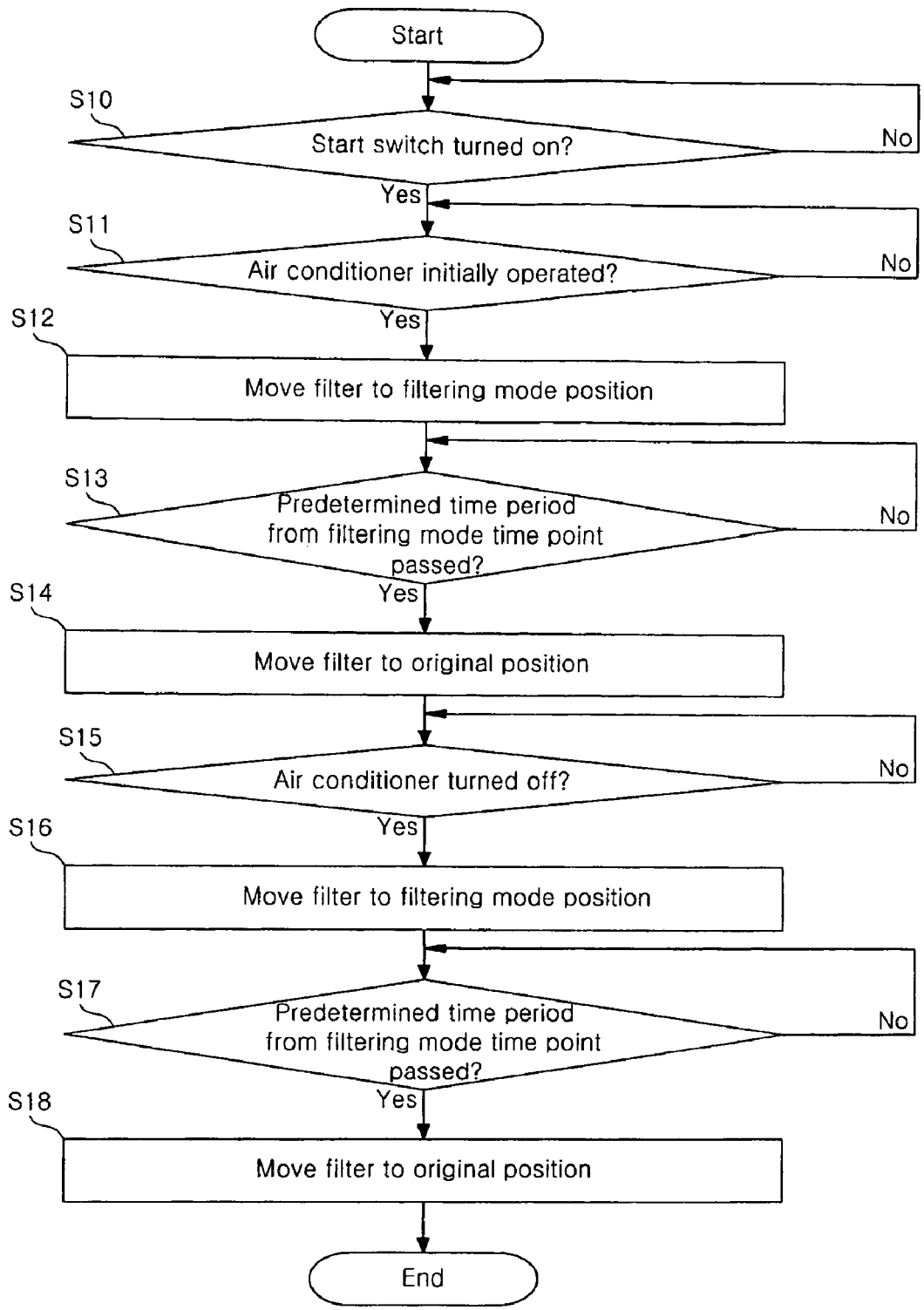

AIR CONDITIONING SYSTEM FOR CAR

TECHNICAL FIELD

The present invention relates to an air conditioning system for a car, and more particularly, to an air conditioning system for a car, which can automatically remove a malodor generated due to condensate water remaining in an evaporator during a certain period of time after operation of an air conditioner or turning-off of the air conditioner and control a filtering mode time of a filter to filter an air, thereby keeping an agreeable environment inside the car and reducing a maintenance cost of the filter.

BACKGROUND ART

In general, an air conditioning system for a car selectively passes and heat-exchanges air introduced into the car by a blower unit toward an evaporator in which refrigerant flows or a heater core in which cooling water of an engine flows, and then, distributes cooled or heated air into the car in various directions through air outlets communicating with components mounted inside the car.

Such air conditioning system includes an air filter for preventing introduction of dust contained in the air introduced into the car by the blower unit, various harmful matters such as benzene and toluene exhausted from exhaust gas, or malodor so as to provide a driver or passengers with purified air.

The air filter is formed in such a way that non-woven fabric or filter media of paper material which is folded in zigzag to physically adsorb and filter bacterial corpuscles, harmful compositions or odor compositions using active carbon particles is mounted inside a flat type frame. The air filter is generally mounted at the upstream side of the blower unit or between the blower unit and the evaporator.

However, since the air filter, in fact, is arranged in front of the evaporator which is the root of the malodor, the air filter can remove the malodor contained in the air introduced from the outside, but cannot directly remove a malodor generated from the evaporator itself.

That is, when the air conditioner is operated in sultry weather in the summer season, due to operation of the evaporator, a great deal of condensate water is formed on the surface of the evaporator. Such condensate water is generally discharged to the outside through a drain hole formed on the lower portion of the air conditioning case, but it is impossible to discharge the entire amount of the condensate water through the drain hole due to surface tension, so that residual condensate water exists in the air conditioning case or the core of the evaporator and acts as a nourishing bed for fungi. So, if the air conditioner is continuously operated, the malodor generated from the evaporator is discharged to the inside of the car in itself when the air introduced from the outside by the blower unit passes through the evaporator, so that the driver or the passengers may feel severe unpleasantness.

Furthermore, since temperature of the surface of the evaporator is rapidly increased when the air conditioner stops the flourishing operation, bacteria and germs act and propagate more lively due to the condensate water remaining in the evaporator. So, when the air conditioner is reoperated, the malodor is introduced into the inside of the car, and air cleanness inside the car is greatly reduced.

Particularly, since the air filter is fixed at its installation place with no change of position and always exposed to the air blown from the blower unit, when a pre-determined period of time is passed, the odor composition is adsorbed and gathered into fine pores of active carbon and reaches saturation, whereby adsorptive force of the filter is gradually reduced and the odor composition adsorbed in a high temperature state is partially discharged to the inside of the car, so that the inside of the car cannot keep the agreeable environment.

Therefore, since the filter must be periodically replaced with a new one when a pre-determined period of time is passed, the conventional air conditioning system has several disadvantages in that it causes inconvenience in use and expensive maintenance costs due to a frequent replacement of the filter.

Furthermore, in sultry weather in the summer season, the odor composition of a saturated state stained on the surface of the filter is separated from the filter by the outside air of high temperature introduced into the car and generates the malodor.

Meanwhile, unexamined Japanese Patent Publication No. 2001-163049 discloses an air conditioning system for a car with an air filter in the vicinity of an air mixing part for mixing air passing through an evaporator and a heater core.

FIG. 1 schematically shows an air conditioning system for the car.

As shown in FIG. 1, the air conditioning system includes: a cool air channel C mounted between an evaporator 101 and a heater core 102 spaced apart from each other at a predetermined distance and arranged in order inside an air conditioning case 100, the cool air passageway C bypassing the heater core; and a temperature door 106 for selectively controlling the degree of opening of a hot air passageway H in front of the heater core and for controlling temperature of the air discharged to the inside of the car through air outlets 103, 104 and 105 communicating with built-in components of the car according to the degree of opening. Here, a space M formed at the downstream side of the temperature door 106 and the heater core 102 is an air mixing part for supplying air of uniform temperature to the inside the car through the air outlets 103, 104 and 105 after properly mixing the cool air passing through the cool air passageway C and the hot air passing through the hot air passageway H.

An air filter 108, which has the structure described above, is inclinedly mounted in a boundary zone between the air mixing part M and a tail wind chamber 107 in such a way as to stop an entrance of the tail wind chamber 107.

The prior art can effectively remove the air passing through the evaporator 101 and dust and malodor contained in the air by the air filter 108, and cause ventilation resistance to improve air-mixing capacity.

However, as described above, since the air filter 108 is fixed on the air passageway always exposed to the air, the prior art may cause ill effects due to limitation in adsorptive force of the filter when the predetermined period of time is passed, and requires lots of maintenance costs due to the periodic replacement cycle of the filter.

DISCLOSURE OF INVENTION

Technical Solution

Accordingly, the present invention has been made to solve the above-mentioned problems occurring in the prior art, and it is an object of the present invention to provide an air conditioning system for a car, which can automatically remove a malodor generated due to condensate water remaining in an evaporator during a pre-determined period of time after operation of an air conditioner or turning-off of the air conditioner and control a filtering mode time of a filter to filter a blast air, thereby keeping an agreeable environment inside the car and reducing a maintenance cost of the filter.

To accomplish the above object, according to the present invention, there is provided an air conditioning system for a car including: an air conditioning case having an air inlet formed at an entrance part of a side thereof, and a plurality of air outlets formed at an exit part of the other side thereof; an evaporator and a heater core for heat-exchanging air introduced through the air inlet; a temperature door mounted between the evaporator and the heater core for controlling the degree of opening of a cool air passageway bypassing the heater core and a hot air passageway located in front of the heater core; and a shiftable deodorization filter located on a flow channel of the cool air passageway and moved to a filtering mode position to screen the flow channel of the cool air passageway during a predetermined period of time after an air conditioner is turned on or off, whereby the air passing through the cool air passageway and a malodor contained in the air are filtered.

Furthermore, according to the present invention, the air conditioning system further includes means for detecting generation of condensate water generated from the evaporator after the air conditioner is turned on or off.

The shiftable deodorization filter includes: a flat type filter case having the inner space; a filter media mounted on the inner space of the filter case 31; and rotary shafts protruding from both sides of the upper end thereof in a longitudinal direction of the filter case and coupled to shaft holes formed on both side walls of the air conditioning case so as to be rotated at the upper end of the filter case, an end of the rotary shaft being connected to driving means such as an actuator at an end thereof.

The shiftable deodorization filter includes: a filter case having the inner space and curved in an arc shape; a filter media mounted on the inner space of the filter case; guide pins protruding from the upper and lower edges of both sides of the filter case; and racks formed along side ends of the upper surface of the filter case in a longitudinal direction.

The shiftable deodorization filter is slidably moved by actuating means, which includes: a driving shaft rotatably placed on the filter case in a width direction of the filter case and supported by shaft holes formed on both side walls of the air conditioning case; and pinion gears supported by the driving shaft and engaging the racks.

The air conditioning case includes: a pair of guide rails formed in an arc shape to which the guide pins of the shiftable deodorization filter are slidably fit and supported; and an accommodating space for accommodating the shiftable deodorization filter therein during a non-filtering mode.

The filter media the shiftable deodorization filter is detachably mounted on the filter case so as to be replaced with another one.

The temperature door is a plate type door rotating on a rotary shaft formed on the upper end of a door member.

The temperature door is a sliding door including: a door member having pre-determined width and length and curved in an arc shape; guide pins protruding from upper and lower edges of both sides of the door member; and racks formed along both side ends of the upper surface of the door member and engaging the pinion gears.

The air conditioning case includes a pair of guide rails formed in an arc shape to which the guide pins of the temp temperature door are slidably fit and supported.

The shiftable deodorization filter filters air and a malodor during a predetermined period of time, and then, is returned to its original position where an amount of the air passing through the filter is minimized.

DESCRIPTION OF DRAWINGS

Further objects and advantages of the invention can be more fully understood from the following detailed description taken in conjunction with the accompanying drawings, in which:

FIG. 13 is a flow chart showing a control method of the shiftable deodorization filter of the air conditioning system for the car according to the first to third preferred embodiments of the present invention.

MODE FOR INVENTION

Reference will be now made in detail to the preferred embodiment of the present invention with reference to the attached drawings.

Embodiment 1

Figure 1:
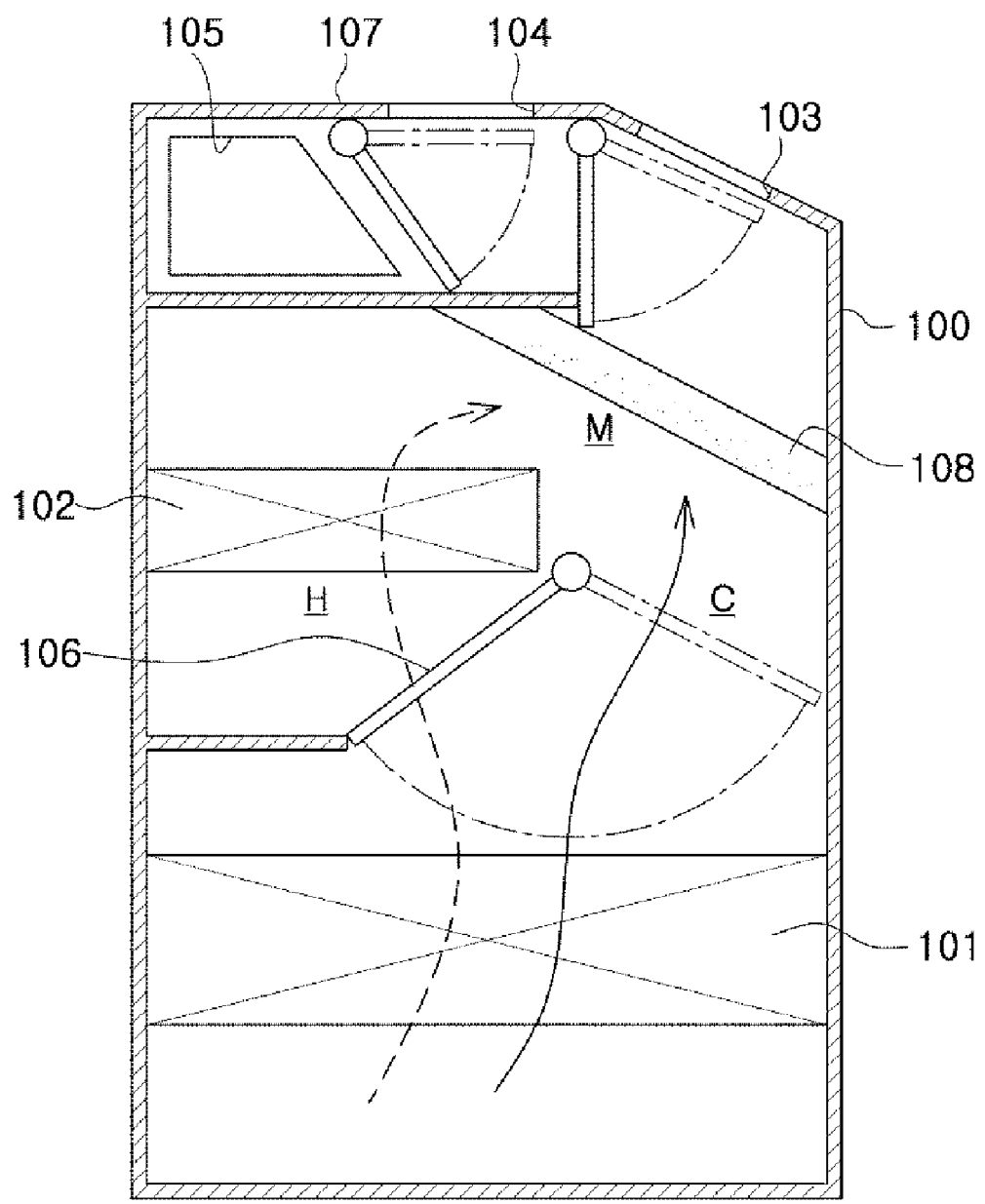
FIG. 1 is a brief sectional view of a conventional air conditioning system for a car.
Figure 2:
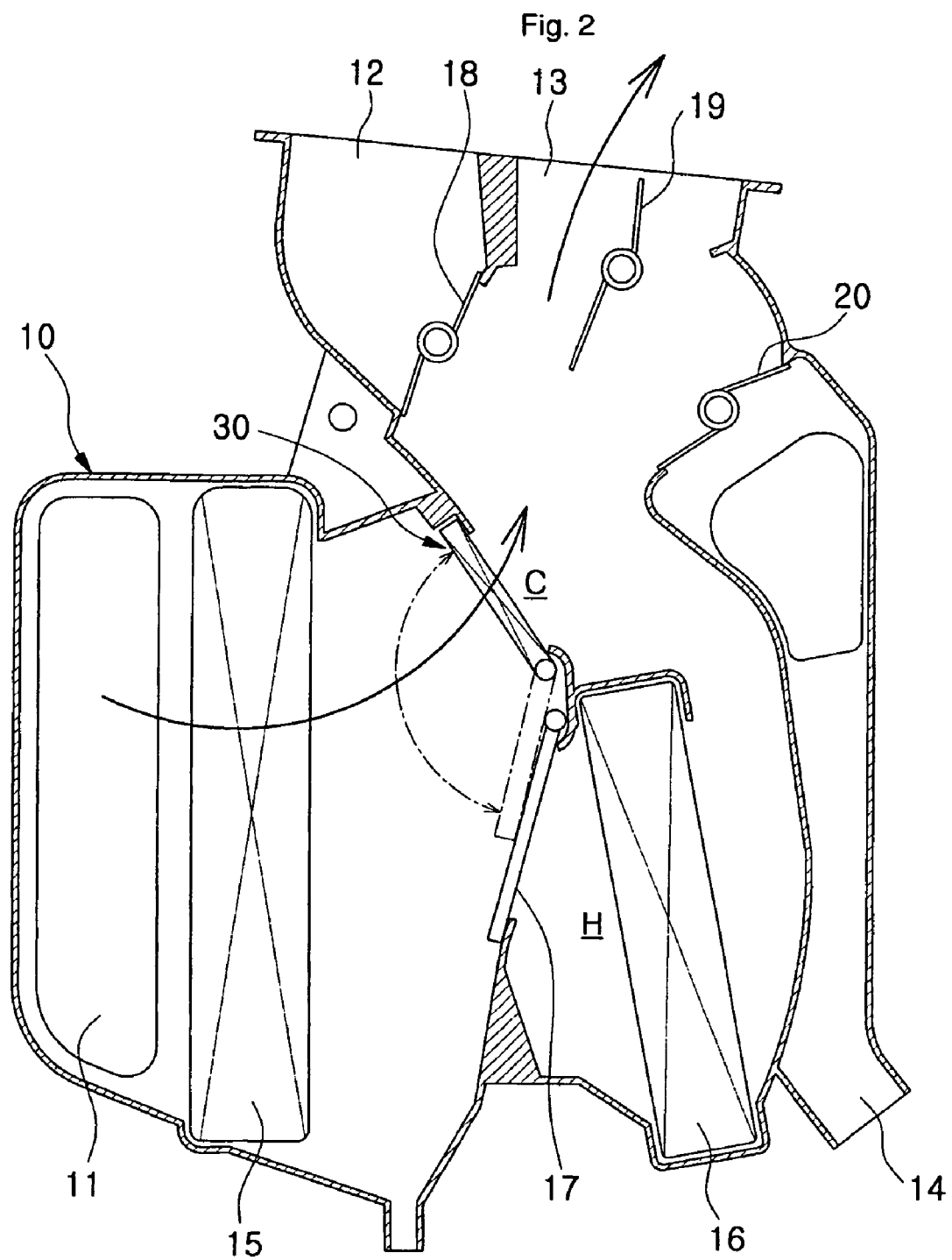
FIG. 2 is a sectional view of an air conditioning system for a car according to a first preferred embodiment of the present invention, showing a state of a filtering mode during the maximum cooling mode.
Figure 3:
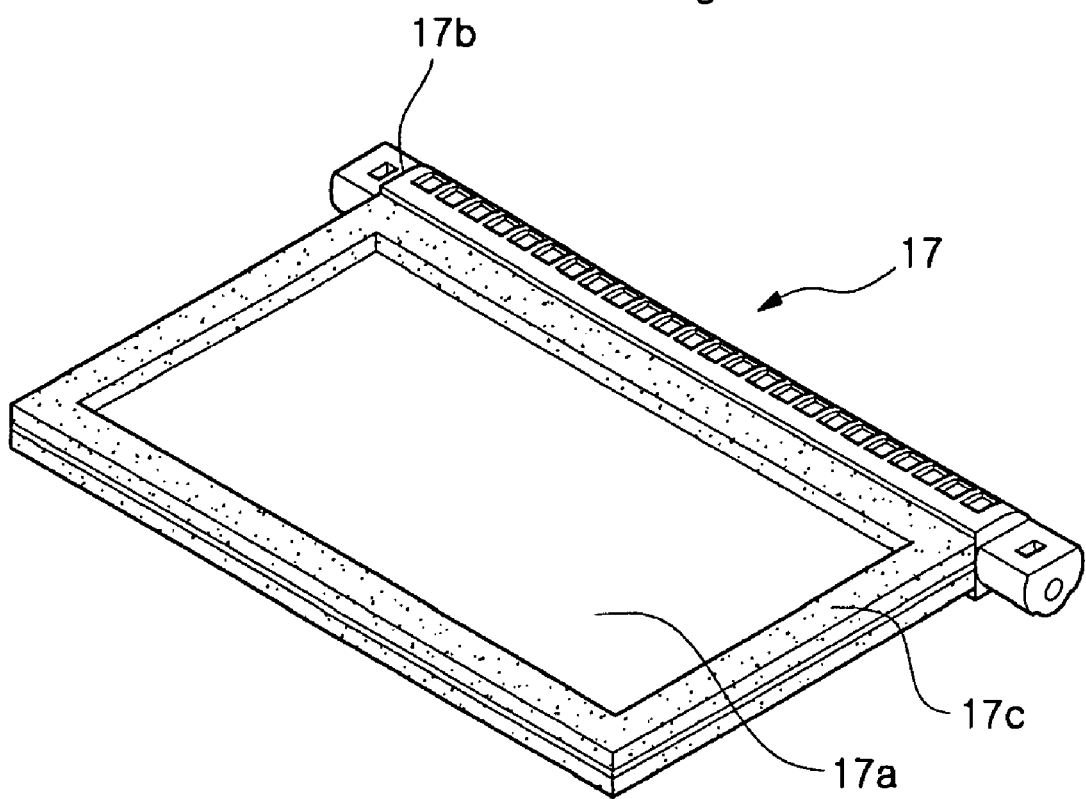
FIG. 3 is a configurative view of a temperature door of FIG. 2.
Figure 4:
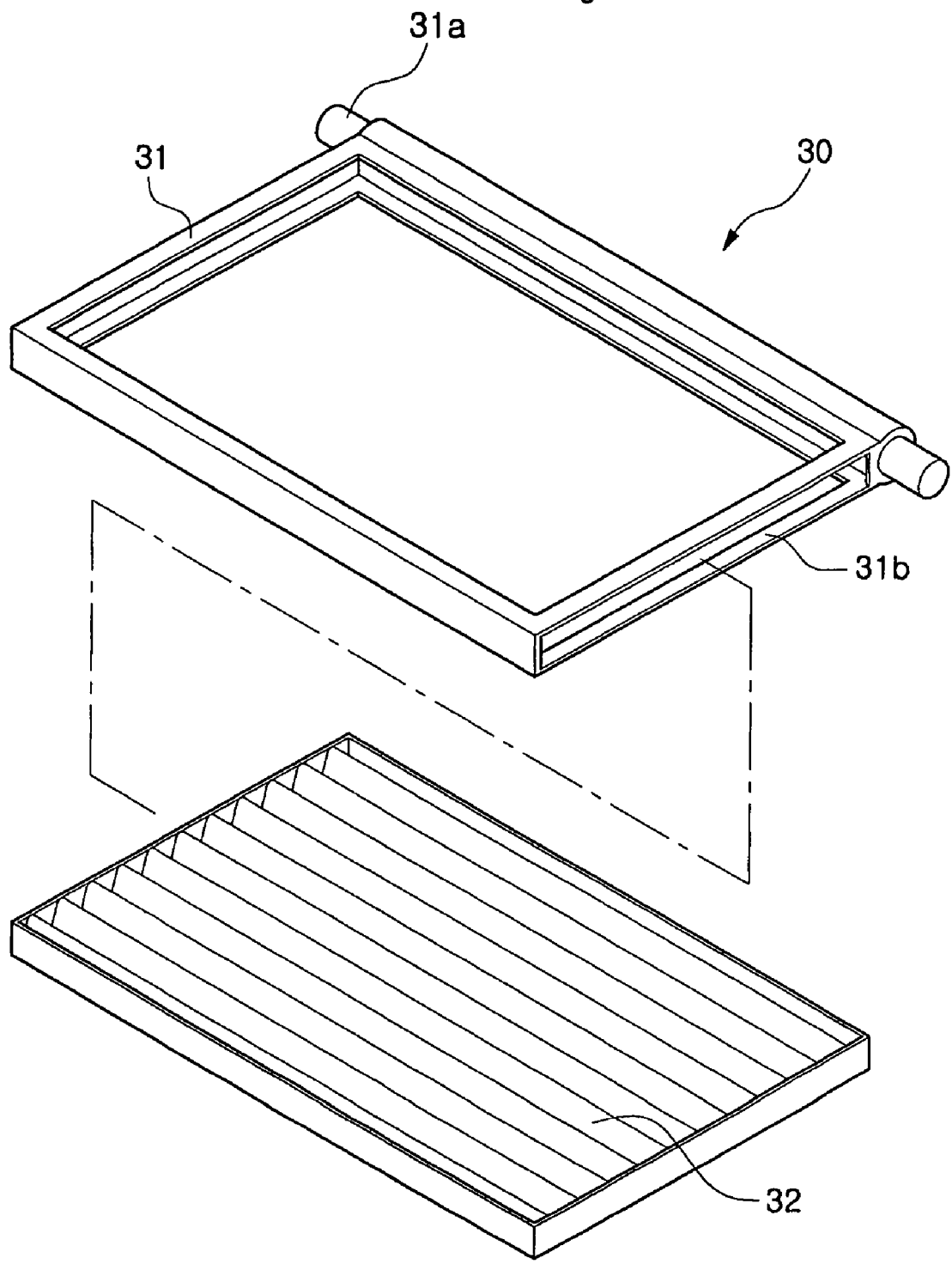
FIG. 4 is a configurative view of a shiftable deodorization filter of FIG. 2.
Figure 5:
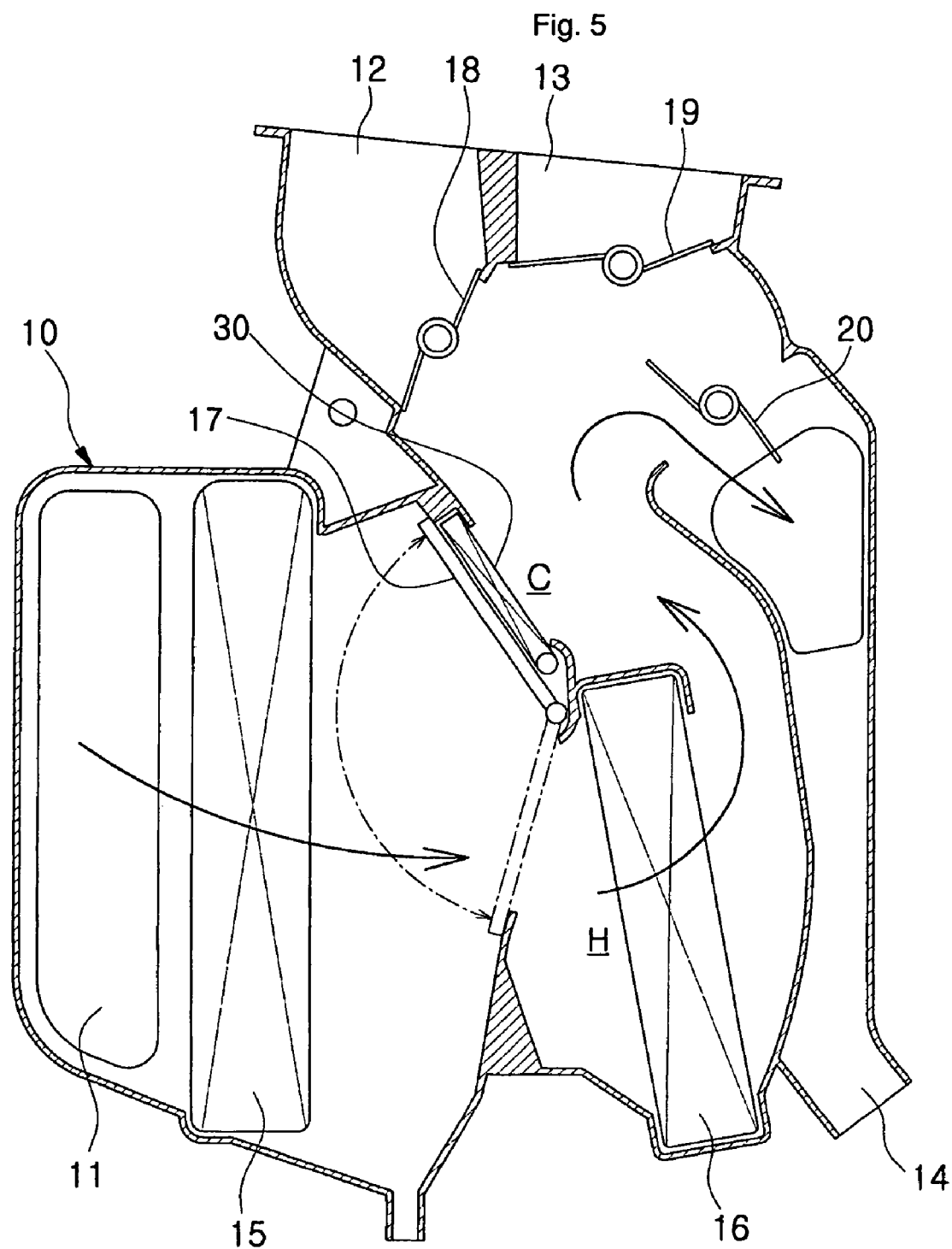
FIG. 5 is a sectional view of an air conditioning system for a car according to a first preferred embodiment of the present invention, showing a state of a non-filtering mode during the maximum cooling mode.

FIG. 2 is a sectional view of an air conditioning system for a car according to a first preferred embodiment of the present invention, showing a state of a filtering mode during the maximum cooling mode, FIG. 3 is a configurative view of a temperature door of FIG. 2, FIG. 4 is a configurative view of a shiftable deodorization filter of FIG. 2, and FIG. 5 is a sectional view of an air conditioning system for a car according to a first preferred embodiment of the present invention, showing a state of a non-filtering mode during the maximum cooling mode.

An air conditioning system for a car according to this embodiment is a semi-center mounting type air conditioning system having an evaporator and a heater core, which are integrated with each other in a case.

That is, as shown in FIG. 2, the air conditioning system for the car includes an air conditioning case 10 having an air inlet 11 formed at an entrance part of a side thereof and a plurality of air outlets 12, 13 and 14 formed at an exit part of the other side thereof, and an evaporator 15 and a heater core 16 disposed inside the air conditioning case 10 in order from the air inlet 11 side and spaced apart from each other at a predetermined distance.

In the air conditioning system having the above configuration, between the evaporator 15 and the heater core 16, provided are a cool air passageway C bypassing the heater core 16 and a temperature door 17 for selectively controlling the degree of opening of a hot air passageway H located in front of the heater core 16 and for controlling temperature of the air discharge d to the inside of the car through the air outlets 12, 13 and 14 according to the degree of opening. Furthermore, the air outlets 12, 13 and 14 respectively include mode doors 18, 19 and 20 respectively mounted thereon for selectively controlling an amount of the cool/hot air discharged to the inside of the car through the air outlets 12, 13 and 14. Here, as shown in FIG. 3, the temperature door 17 is a plate type door, which includes a flat type door member 17a, and rotary shafts 17b protruding from both sides of the upper end of the door member 17a in a longitudinal direction so as to be rotated at the upper end of the door member 17a, the rotary shafts 17b being connected to driving means such as an actuator (not shown) in a state where the rotary shafts 17b are fixed to first shaft holes (not shown) formed at both sides of the air conditioning case 10. In the drawing, the reference numeral 17c designates a sealing member for keeping a sealed state.

Each mode door has a butterfly-shaped structure in order to minimize ventilation resistance during a flow of air toward the air outlets 12, 13 and 14.

Meanwhile, a shiftable deodorization filter 30 of a hinge type is mounted on a flow channel of the cool air passageway C for filtering the air passing through the evaporator 15 and malodor contained in the air by screening a flow channel of the cool air passageway C. The shiftable deodorization filter 30 may be a combined filter in which a dust removing filter and an odor removing filter are integrated with each other, or an odor removing filter for removing the malodor.

The shiftable deodorization filter 30 is set to operate within a predetermined period of time according to a detected amount of temperature and humidity which generates condensate water from the evaporator after the air conditioner is turned on or off.

In general, the evaporator 15 is kept in temperature of about 0~10° C. during operation of the air conditioner, but when the operation of the air conditioner is stopped, the evaporator 15 generates condensate water for a predetermined period of time by contacting with the outside hot air. When the car travels after the operation of the air conditioner is stopped, since temperature of the core of the evaporator 15 is continuously increase to about 50~60 ° C., at this time, condensate water is not generated any more.

In order to supply fresh air to the inside of the car by thoroughly, removing the malodor generated from the evaporator 15 at the time when condensate water is generated, the shiftable deodorization filter 30 is rotatably mounted on the flow channel of the cool air passageway C.

A time point when condensate water is generated after the air conditioner is turned on or off is decided by means for detecting generation of condensate water. The means for detecting generation of condensate water may include a temperature sensor and a humidity sensor (not shown) respectively mounted on the core of the evaporator 15.

The shiftable deodorization filter 30 for the above function, like the structure of the temperature door 17, is rotatable within a range of a predetermined angle centering on the upper end thereof. That is, as shown in FIG. 4, the shiftable deodorization filter 30 includes: a flat type filter case 31 having an inner space; a filter media 32 mounted on the inner space of the flat type filter case 31; and rotary shafts 31a protruding from both sides of the upper end thereof in a longitudinal direction of the filter case 31 and coupled to second shaft holes (not shown) formed at both side walls of the air conditioning case 10 so as to be rotated at the upper end of the filter case 31, and connected to driving means such as an actuator at an end thereof.

The shiftable deodorization filter 30 may have a structure that the filter media 32 is integrated with the filter case 31 or a structure that the filter media 32 is detachably mounted on the filter case 31 so as to be replaced with new one. In the latter case, as shown in FIG. 4, it is preferable that an insertion slot 31b for inserting the filter media 32 thereto is formed at a side of the filter case 31.

By the above configuration, the shiftable deodorization filter 30 detects that condensate water is generated by using the temperature sensor and the humidity sensor of the evaporator 15 when the air conditioner is turned on or off, and then, as shown in FIG. 2, is rotated to the position to screen the cool air passageway C, that is, a filtering mode position. The time point of the filtering mode of the shiftable deodorization filter 30 is achieved by a controller (not shown) for controlling it according to a detection signal received from the temperature sensor and the humidity sensor.

The filtering mode by the shiftable deodorization filter 30, as shown by the solid line of FIG. 2, is carried out only for a predetermined period of time during the maximum heating mode, and returned to the non-filtering mode, which is the original position, as shown by the dotted line of FIG. 2, after a lapse of the period of time. At this time, the air passing through the evaporator 15 and the malodor contained in the air are filtered by the shiftable deodorization filter 30 located at the position to screen the flow channel of the cool air passageway C and discharged to the upper part inside the car through the air outlet 13, whereby the inside environment of the car can be kept agreeably.

Moreover, the shiftable deodorization filter 30 is exposed to the air flow channel only during the filtering mode, and particularly, the durability of the filter can be improved by reducing the exposed time period as short as possible, whereby maintenance costs of the filter can be remarkably reduced.

Figure 6:
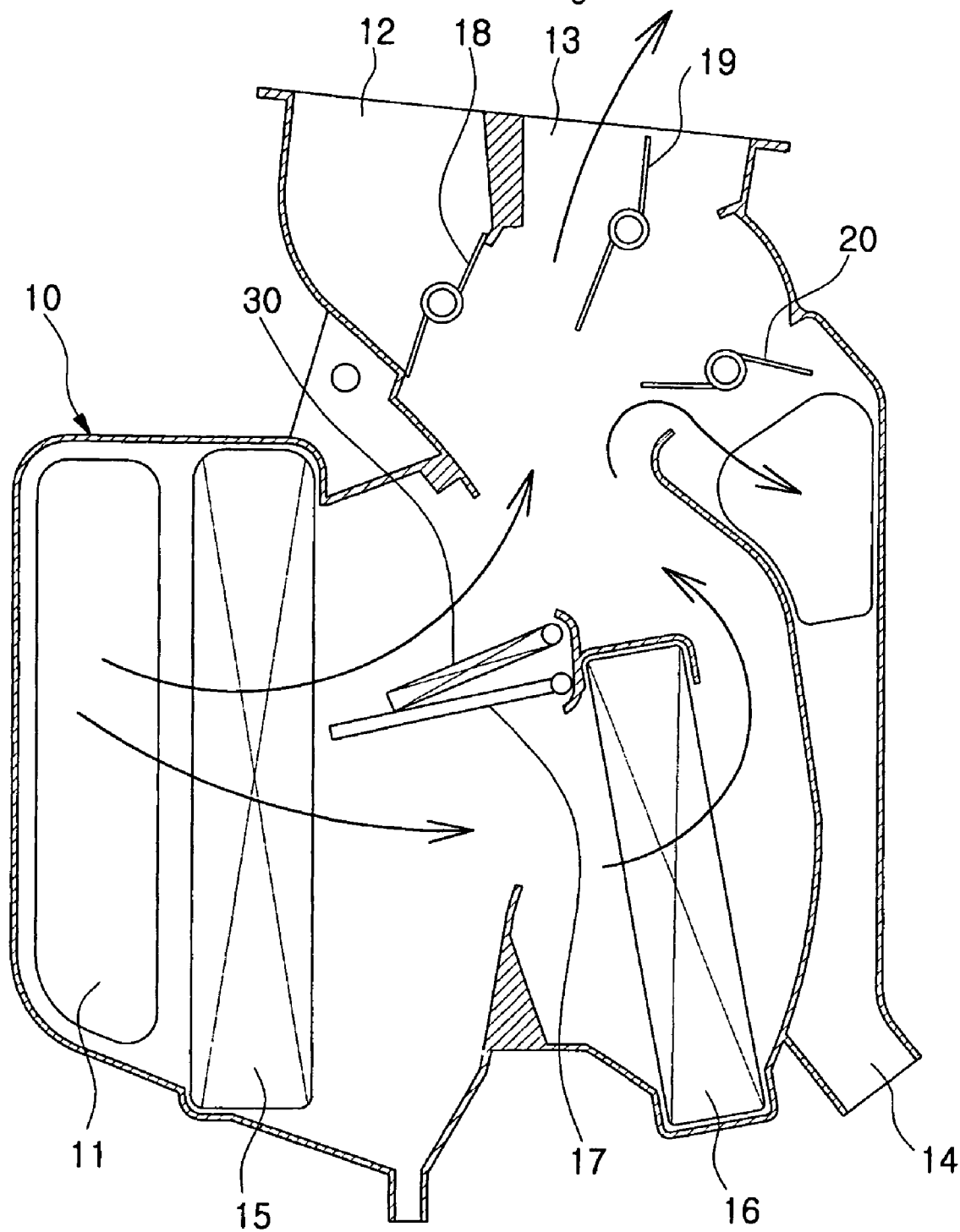
FIG. 6 is a sectional view of an air conditioning system for a car according to the first preferred embodiment of the present invention, showing a state of a non-filtering mode during a ½ cooling mode.

Meanwhile, during the maximum heating mode as shown in FIG. 5, the shiftable deodorization filter 30 is located in rear of the temperature door 17 closing the flow channel of the cool air passageway C, and so, does not execute the filtering mode. During a ½ cooling mode as shown in FIG. 6, the shiftable deodorization filter 30 is located at a neutral position where cool air and hot air are mixed with each other, like the temperature door 17, so as not to block a flow of air as good as possible after executing the filtering mode like in the maximum cooling mode, and at this time, does not execute the filtering mode.

As described above, the shiftable deodorization filter 30 is located at a place where the air introduced into the air conditioning case 10 does not pass during the non-filtering mode so as to enlarge the durability of the filter, whereby the maintenance costs of the filter can be remarkably reduced.

When the shiftable deodorization filter 30 is used together with an air filter at the upstream side of the evaporator 15 like the prior arts for filtering external foreign matters, efficiencies of the shiftable deodorization filter 30 is improved more.

Referring to FIG. 13, a method for controlling the shiftable deodorization filter 30 according to the present invention will be described in detail as follows.

First, checking as to whether a start switch of the car is in an ON state is performed (S10).

After the step (S10), checking as to whether the air conditioner is initially actuated is performed (S11).

As a result of the check in the step (S11), if the air conditioner was initially actuated, the temperature sensor and the humidity sensor mounted on the core of the evaporator 15 detect generation of condensate water, and then, a controlling device of an air conditioning controller moves the shiftable deodorization filter 30 to the position to screen the cool air passageway C, namely, the position for the air filtering mode. After that, the shiftable deodorization filter 30 filters the air introduced from the blower unit (not shown) and passing through the evaporator 15 and the malodor contained in the air (S12).

In the step (S12), check the time point for the filtering mode by the shiftable deodorization filter 30 has passed (S13). In the step (S13), a timer, which is connected to the controlling device of the air conditioning controller, and, in which the pre-determined period of time from the time point of actuation of the air conditioner is preset, detects whether or not the predetermined time period for the filtering mode has passed. For example, the period of time may be set within a range of 10~60 seconds from the actuation time point of the air conditioner.

As a result of the step (S13), if the predetermined period of time for the filtering mode has passed, the shiftable deodorization filter 30 is returned to the non-filtering mode position which is the original position (S14).

After the step (S14), checking the air conditioner is turned off now is performed (S15).

As a result of the step (S15), it is determined that the air conditioner is turned off, the shiftable deodorization filter 30 is moved to the filtering mode position (S16), and when the predetermined period of time for the filtering mode has passed (S17), the shiftable deodorization filter 30 is returned to the original position where the amount of the air passing through the filter is minimized (S18), and then the process is ended. Here, the period of time for keeping the filtering mode may be set within a range of, for example, 10~60 seconds, or set in proportion to the actuation period of time of the air conditioner. The procedure after the step (S16) can be carried out by a time relay is mounted on the controlling device so as to turn off the air conditioner after a pre-determined period of time.

As described above, according to the present invention, the shiftable deodorization filter 30 which is rotatably mounted on the flow channel of the cool air passageway C is moved to the position to screen the flow channel of the cool air passageway C after the air conditioner is turned on or off so as to execute the filtering mode only during the predetermined period of time, whereby the malodor generated by condensate water remaining in the evaporator 15 and the air conditioning case 10 can be removed and fresh air can be supplied to the inside of the car. Particularly, since the shiftable deodorization filter 30 executes the filtering mode during the predetermined period of time after the air conditioner is turned off, when the air conditioner is actuated again, the malodor is not reeked inside the car so as to always keep the agreeable environment inside the car.

Moreover, since the shiftable deodorization filter 30 is not exposed to the air after the filtering mode if possible, the durability of the filter can be improved and the maintenance costs of the filter can be remarkably reduced.

Embodiment 2

Figure 7:
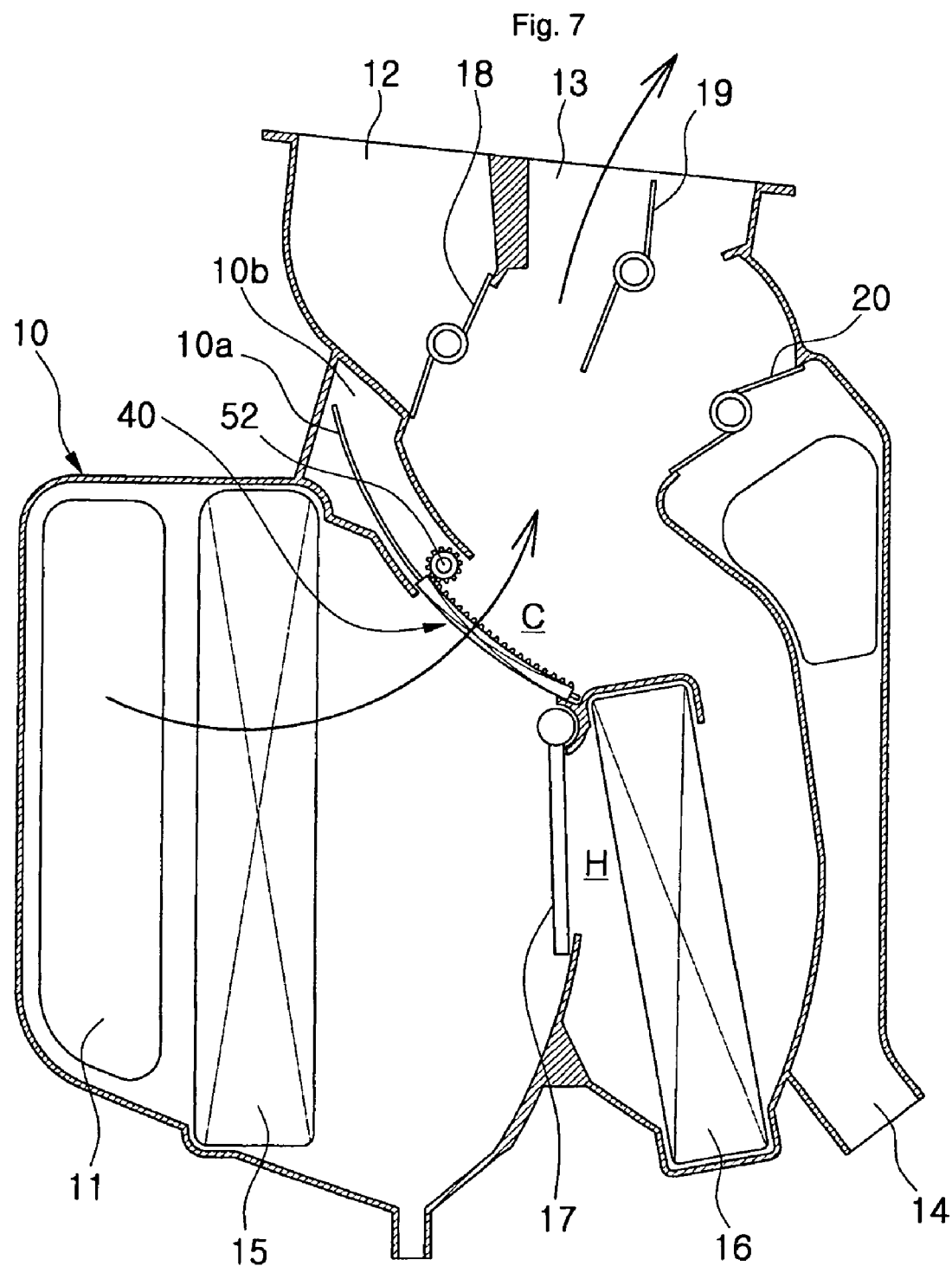
FIG. 7 is a sectional view of an air conditioning system for a car according to a second preferred embodiment of the present invention, showing a state of a filtering mode during the maximum cooling mode.
Figure 8:
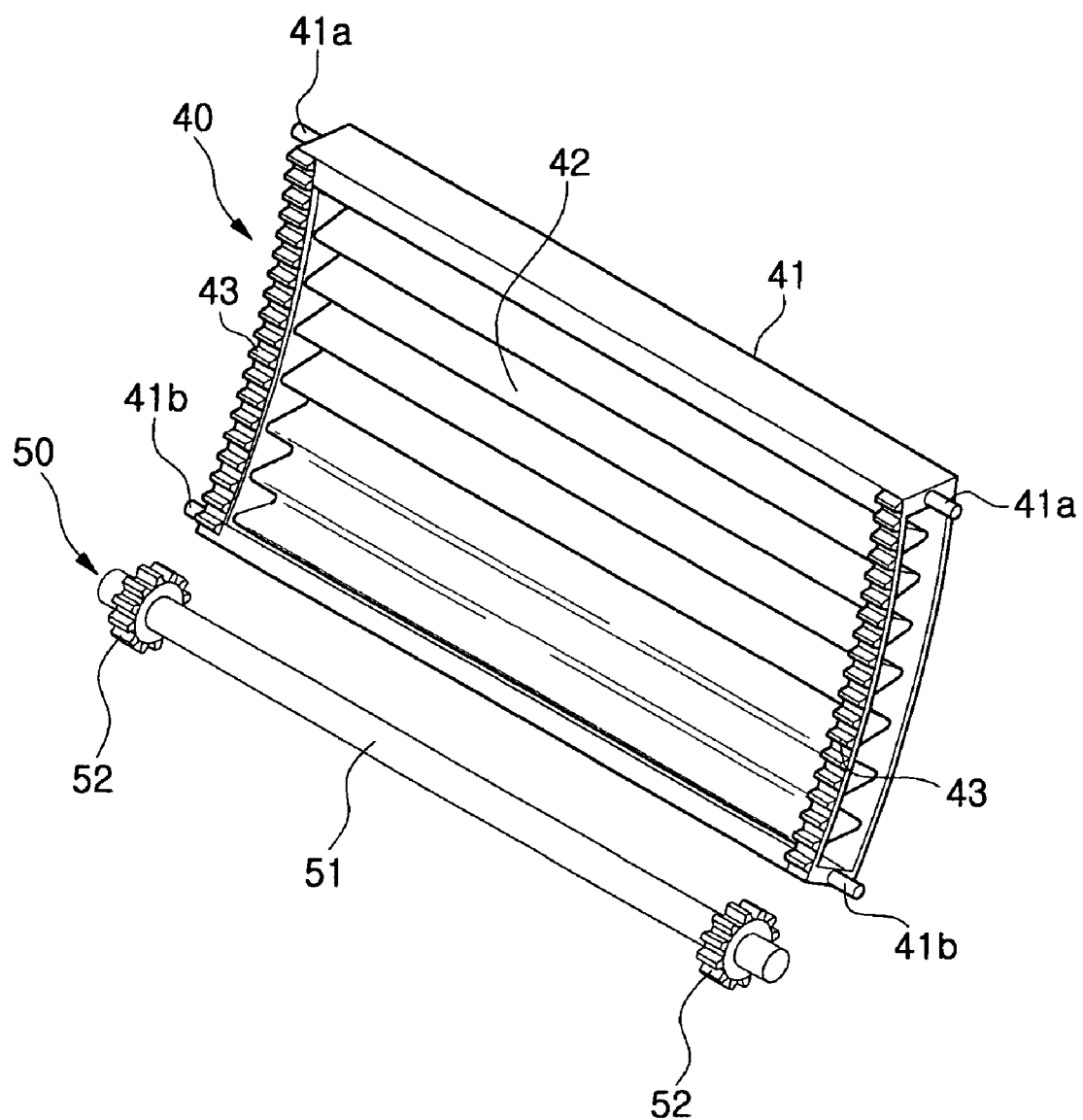
FIG. 8 is a configurative view of a shiftable deodorization filter of FIG. 7.
Figure 9:
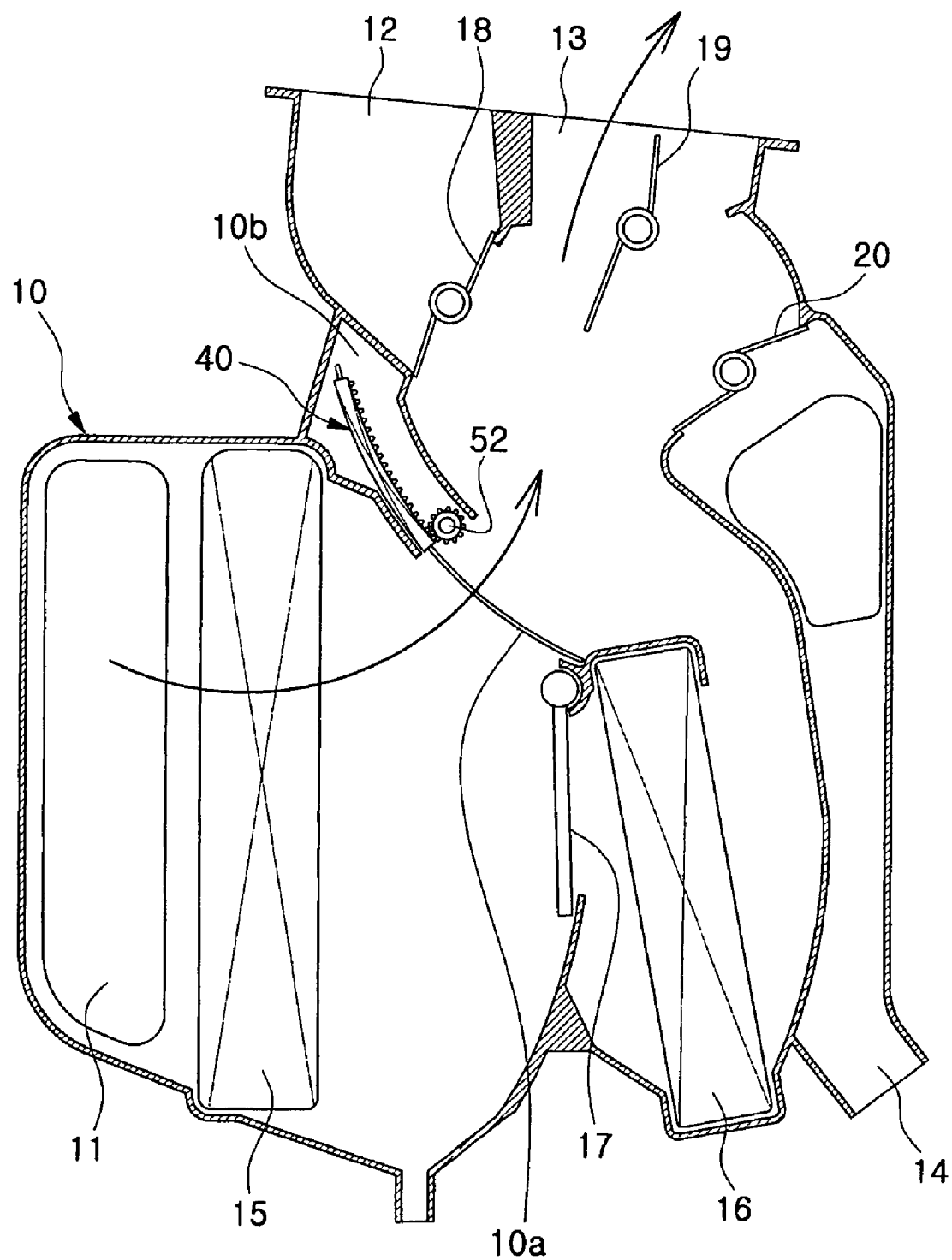
FIG. 9 is a sectional view of an air conditioning system for a car according to the second preferred embodiment of the present invention, showing a state of a non-filtering mode during the maximum cooling mode.

FIG. 7 is a sectional view of an air conditioning system for a car according to a second preferred embodiment of the present invention, showing a state of a filtering mode during the maximum cooling mode, FIG. 8 is a configurative view of a shiftable deodorization filter of FIG. 7, and FIG. 9 is a sectional view of an air conditioning system for a car according to the second preferred embodiment of the present invention, showing a state of a non-filtering mode during the maximum cooling mode.

The second preferred embodiment has the same configuration and function as the first preferred embodiment excepting that the shiftable deodorization filter of the second embodiment has a slidable structure. So, same components have same reference numerals in drawings, and repeated description will be omitted.

As shown in FIG. 8, shiftable deodorization filter 40 according to the second preferred embodiment includes: a filter case 41 having an inner space and being curved in an arc shape; a filter media 42 mounted on the inner space of the filter case 41, guide pins 41a and 41b protruding from the upper and lower ends of both sides of the filter case 41; and racks 43 formed along side ends of the upper surface of the filter case 41 in a longitudinal direction.

Width and length of the filter case 41 are nearly similar to width and length of the flow channel zone of the cool air passageway C.

The shiftable deodorization filter 40 having the above configuration is coupled with actuating means 50 for actuation of the filter 40.

The actuating means 50 includes: a driving shaft 51 rotatably placed on the filter case 41 in a width direction of the filter case 41 and supported by shaft holes (not shown) formed on both side walls of the air conditioning case 10; and pinion gears 52 as driving gears supported in the vicinity of both ends of the driving shaft 51 and engaging the racks 43. By the above, the shiftable deodorization filter 40 is actuated by the actuating means 50 such as an actuator connected to an end of the driving shaft 51 (not shown).

Meanwhile, as shown in FIG. 7, a pair of guide rails 10a, to which the guide pins 41a and 41b of the filter case 41 are slidably fit and supported, are formed integrally with the inner side walls of the air conditioning case 10, whereby the shiftable deodorization filter 40 can be slidably moved to the position to screen the flow channel of the cool air passageway C on the driving shaft 51 during the filtering mode.

The guide pins 41a and 41b serve to reduce friction resistance when the shiftable deodorization filter 40 is slidably moved along the guide rails 10a.

As shown in FIGS. 7 and 9, it is preferable that the guide rails 10a are curved in an arc shape like the shape of the shiftable deodorization filter 40 so as to smoothly move the shiftable deodorization filter 40. By the above structure of the guide rails 10a, the shiftable deodorization filter 40 can be slidably moved with the minimum driving force while drawing a trace along the guide rails 10a.

Additionally, to prevent exposure of the shiftable deodorization filter 40 onto the airflow channel during the non-filtering mode, an accommodating space 10b is formed on the inner sidewall of the air conditioning case 10 to fully accommodate the shiftable deodorization filter 40 therein.

The shiftable deodorization filter 40, like the shiftable deodorization filter 30 of the first preferred embodiment, executes the filtering mode during the predetermined period of time after the air conditioner is turned on or off, whereby the malodor generated from the evaporator 15 can be thoroughly removed.

That is, the shiftable deodorization filter 40, during the maximum cooling mode as shown in FIG. 7, is slidably moved to the position to screen the flow channel of the cool air passageway C along the guide rails 10*a* of the air conditioning case 10 by interaction between the pinion gears 52 of the driving shaft 51 rotated by the actuator and the racks 43 of the filter case 41. The shiftable deodorization filter 40 executes the filtering mode at this position during the predetermined period of time. At this time, the air passing through the evaporator 15 and the malodor contained in the air are filtered by the shiftable deodorization filter 40 located at the position to screen the flow channel of the cool air passageway C, and discharged to the upper part inside the car through the air outlet 13, whereby the inside of the care can keep the agreeable environment.

Figure 10:
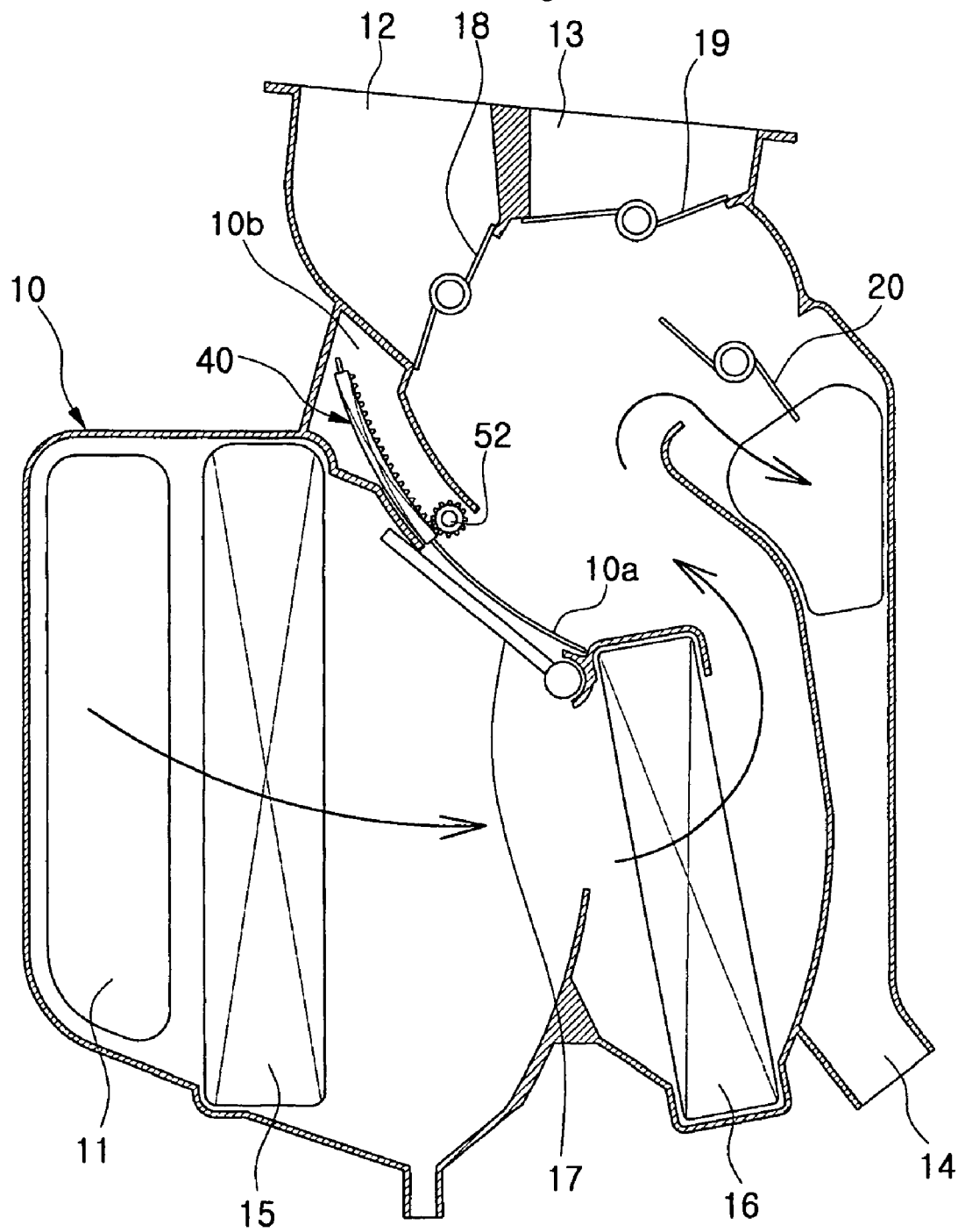
FIG. 10 is a sectional view of an air conditioning system for a car according to the second preferred embodiment of the present invention, showing a state of a non-filtering mode during the maximum heating mode.

The shiftable deodorization filter 40 executes the filtering mode during the pre-determined period of time, and then, is returned into the accommodating space 10*b*, which is the original position (see FIG. 9). As described above, since the shiftable deodorization filter 40 is fully shifted to the containing space 10*b* during the non-filtering mode without exposure to the air flow channel, the durability of the filter can be improved, and the maintenance costs of the filter can be remarkably reduced. Since there is no need to execute the filtering mode during the maximum heating mode as shown in FIG. 10, the shiftable deodorization filter 40 is accommodated in the accommodating space 10*b*.

Embodiment 3

Figure 11:
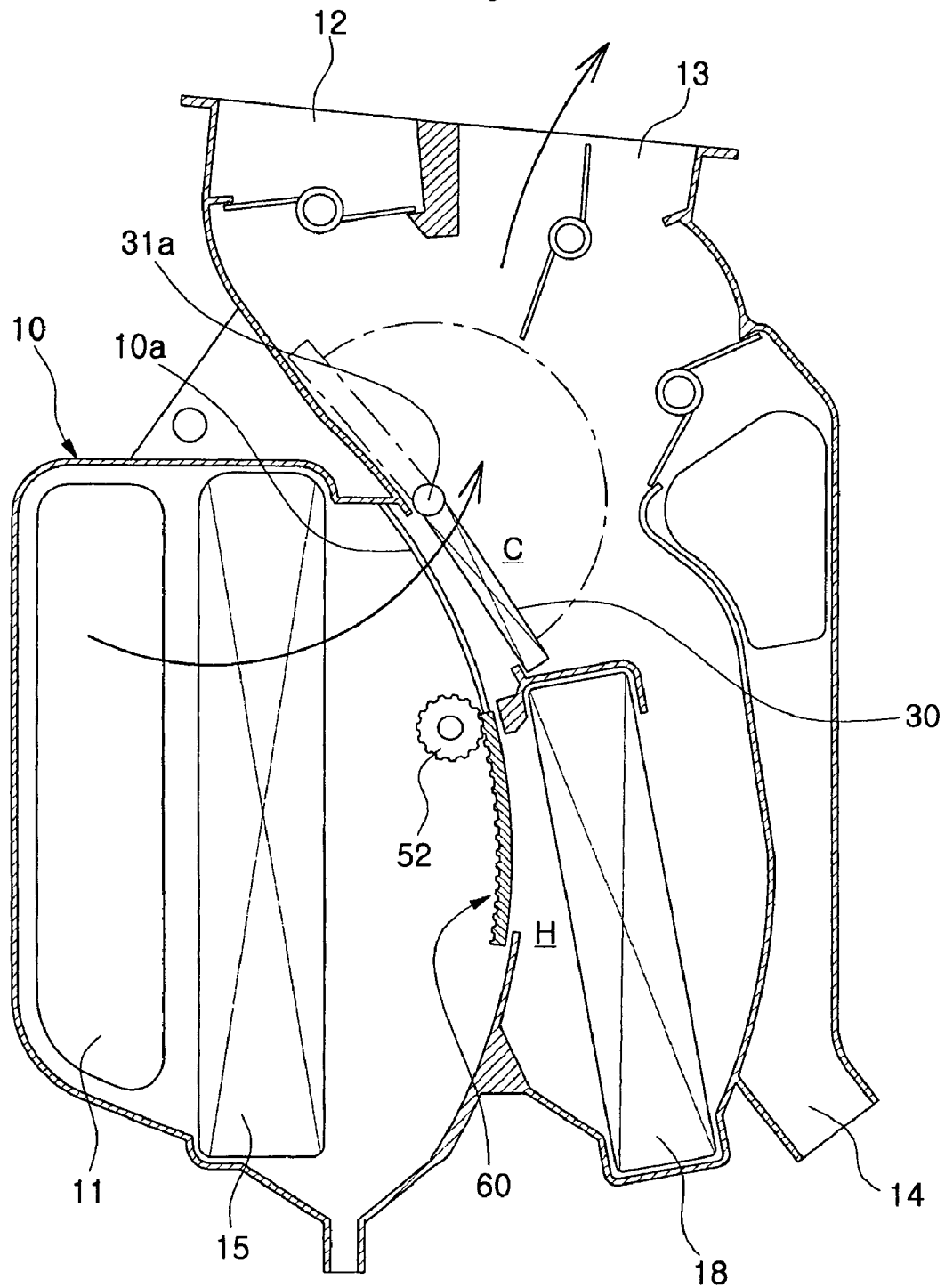
FIG. 11 is a sectional view of an air conditioning system for a car according to a third preferred embodiment of the present invention, showing a state of a filtering mode during the maximum cooling mode.
Figure 12:
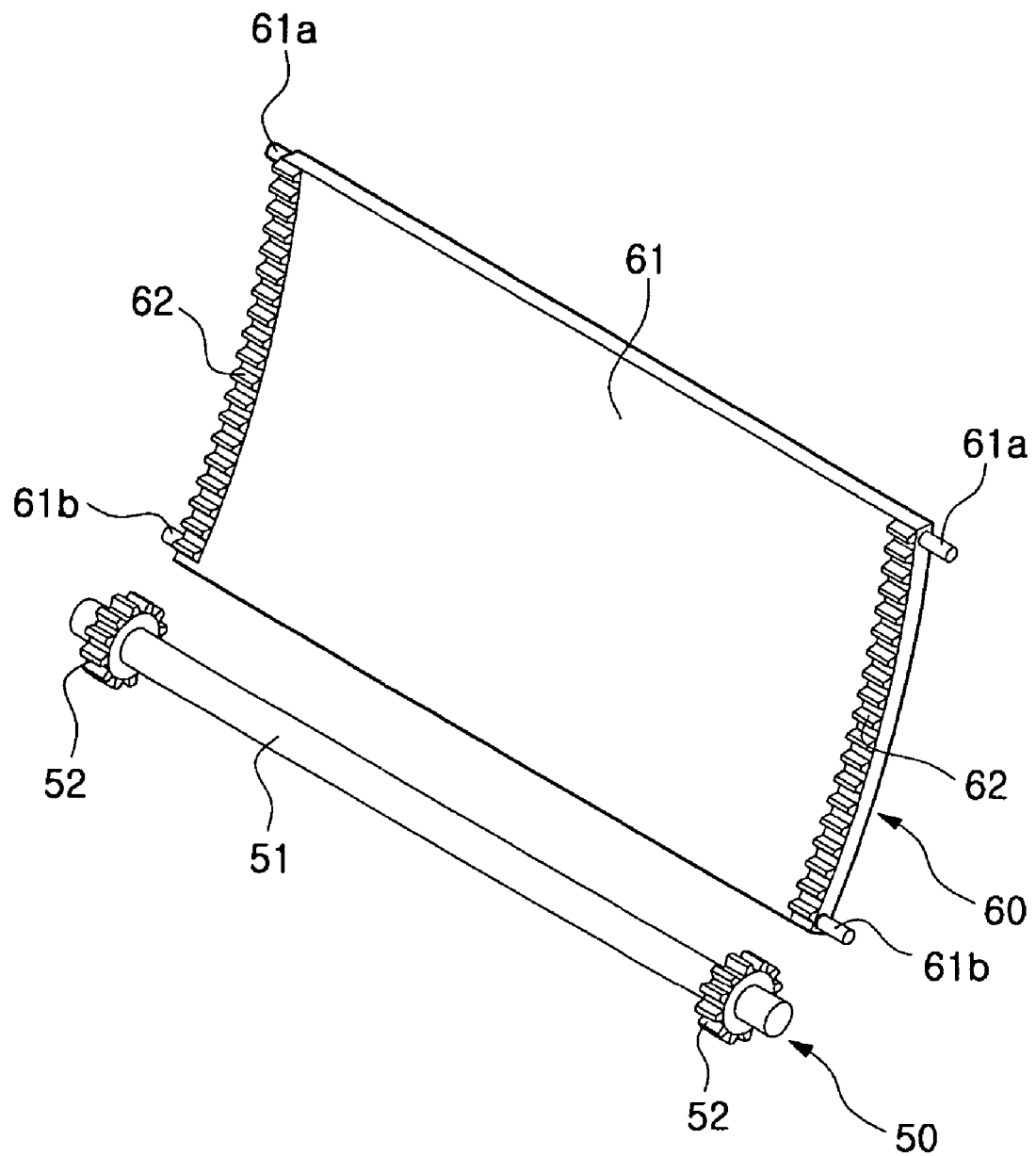
FIG. 12 is a configurative view of a temperature door of FIG. 1.

FIG. 11 is a sectional view of an air conditioning system for a car according to a third preferred embodiment of the present invention, showing a state of a filtering mode during the maximum cooling mode, and FIG. 12 is a configurative view of a temperature door of FIG. 11.

The third preferred embodiment has the same configuration and function as the first and second preferred embodiments excepting that the shiftable deodorization filter and the temperature door of the third embodiment have a structure that the shiftable deodorization filter and the temperature door described in the first and second embodiments are combined with each other. So, same components have same reference numerals in drawings, and repeated description will be omitted.

As shown in FIG. 11, the shiftable deodorization filter 30 according to this embodiment is mounted at a position different from that of the shiftable deodorization filter 30 of the first embodiment, but has the same hinge type structure as the shiftable deodorization filter 30 of the first embodiment, which is formed in such a way as to rotate on a rotary shaft 31*a* within a range of a predetermined angle, and so a detailed description of the structure of the shiftable deodorization filter will be omitted.

The temperature door 60 used in this embodiment is a sliding door, which is similar to the structure of the sliding type shiftable deodorization filter 40 of the second embodiment.

Concretely, as shown in FIG. 12, the temperature door 60 includes: a door member 61 having width and length for closing the cool air passageway C or the hot air passageway H and being curved in an arc shape; guide pins 61*a* and 61*b* protruding from upper and lower ends of both sides of the door member 61; and racks 62 formed along both side ends of the upper surface of the door member 61 in a longitudinal direction.

The temperature door 60 is slidably actuated by being connected with driving means 50 as described in the second embodiment.

Moreover, a pair of guide rails 10*a* curved in an arc shape like the shape of the temperature door 20 are integrally formed on the inner side walls of the air conditioning case 10 in order to vertically slide the temperature door 60 between the cool air passageway C and the hot air passageway H. Here, as described above, the guide pins 61*a* and 61*b*, which are slidably fit to the guide rails 10*a*, serve to reduce friction resistance when the temperature door 60 is slidably moved along the guide rails 10*a*.

Operations of the temperature door 60 and the shiftable deodorization filter 30 having the above configurations will be described by mode.

First, during the maximum cooling mode, the temperature door 60 is slidably moved to a place, where the cool air passageway C bypassing the heater core 16 is opened, along the guide rails 10*a* of the air conditioning case 10 by interaction between the pinion gears 52 supported by the driving shaft 51 rotated by the actuator and the racks 62 of the door member 61. At this time, the hot air passageway H is closed by the door member 61 of the temperature door 60. At the same time, the shiftable deodorization filter 30 is rotated on the rotary shaft 31*a*, and moved to the filtering mode position to screen the flow channel of the cool air passageway C.

The air introduced to the air inlet 11 by the blower unit is cooled while passing through the evaporator 15, and discharged to the inside of the car through the air outlet 13 formed on the air conditioning case 10 in a state where the air is filtered by the shiftable deodorization filter 30 located on the flow channel of the cool air passageway C, whereby the inside of the car can be heated under an agreeable environment.

The shiftable deodorization filter 30 executes the filtering mode at the filtering mode position during the predetermined period of time, and then, is returned to its original position, whereby the durability of the filter can be improved since the filter is not exposed to the air flow channel during the non-filtering mode, and the maintenance costs of the filter can be remarkably reduced.

During the maximum heating mode, the temperature door 60 is slidably moved to the position to open the hot air passageway H by the above function, and at this time, the shiftable deodorization filter 30 exists in the original position since there is no need to execute the filtering mode. Moreover, during the ½ cooling mode as shown in FIG. 6, the temperature door 60 is slidably moved to the neutral position where cool air and hot air are mixed with each other, namely, a position where a portion of the cool air passageway C and a portion of the hot air passageway H are opened, immediately after executing the filtering mode. At this time, the shiftable deodorization filter 30 remains in the non-filtering mode position like during the maximum heating mode.

In the present invention, the semi-center mounting type air conditioning system is described, but the present invention can be applied to a center mounting type air conditioning system, where the blower unit, the evaporator and the heater core are mounted inside one case, in the same way as the semi-center mounting type air conditioning system.

Industrial Applicability

As described above, according to the present invention, the shiftable deodorization filter which is rotatably mounted on the flow channel of the cool air passageway located in rear of the temperature door is moved to the position to close the flow channel of the cool air passageway after the air conditioner is turned on or off so as to execute the filtering mode during the predetermined period of time, whereby the malodor generated by condensate water remaining inside the evaporator and the air conditioning case can be removed and fresh air can be supplied to the inside of the car.

Moreover, according to the present invention, the durability of the filter can be enlarged improved since the shiftable deodorization filter is moved to an area where the filter is not exposed to the air after the filtering mode, whereby the maintenance costs of the filter, which were generated by periodically replacing the filter, can be remarkably reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An air conditioning system for a car comprising:
    an air conditioning case having an air inlet formed at an entrance part of a side thereof, and a plurality of air outlets formed at an exit part of the other side thereof;
    an evaporator and a heater core for heat-exchanging air introduced through the air inlet;
    a temperature door mounted between the evaporator and the heater core for controlling the degree of opening of a cool air passageway bypassing the heater core and a hot air passageway located in front of the heater core; and
    a shiftable deodorization filter located on a flow channel of the cool air passageway and configured to be moved to a filtering mode position to screen the whole the flow channel of the cool air passageway during a predetermined period of time after an air conditioner is turned on or off, whereby the air passing through the cool air passageway and a malodor contained in the air are filtered, and
    wherein at the time of a non-filtering mode, the shiftable deodorization filter opens the cool air passageway and returns to an outer side of the flow channel of the cool air passageway.

2. An air conditioning system for a car according to claim 1, further comprising means for detecting generation of condensate water generated from the evaporator after the air conditioner is turned on or off.

3. An air conditioning system for a car according to claim 1, wherein the shiftable deodorization filter includes:
    a flat type filter case having the inner space; a filter media mounted on the inner space of the filter case; and rotary shafts protruding from both sides of the upper end thereof in a longitudinal direction of the filter case and coupled to shaft holes formed on both side walls of the air conditioning case so as to be rotated at the upper end of the filter case, an end of the rotary shaft being connected to driving means.

4. An air conditioning system for a car according to claim 1, wherein the shiftable deodorization filter includes: a filter case having the inner space and being curved in an arc shape; a filter media mounted on the inner space of the filter case; guide pins protruding from the upper and lower edges of both sides of the filter case; and racks formed along side ends of the upper surface of the filter case in a longitudinal direction.

5. An air conditioning system for a car according to claim 4, wherein the shiftable deodorization filter is slidably moved by an actuator including: a driving shaft rotatably placed on the filter case in a width direction of the filter case and supported by shaft holes formed on both side walls of the air conditioning case; and pinion gears supported by the driving shaft and engaging the racks.

6. An air conditioning system for a car according to claim 4 or 5, wherein the air conditioning case includes: a pair of guide rails formed in an arc shape to which the guide pins of the shiftable deodorization filter are slidably fit and supported; and a space for accommodating the shiftable deodorization filter therein during a non-filtering mode.

7. An air conditioning system for a car according to claim 3 or 4, wherein the filter media the shiftable deodorization filter is detachably mounted on the filter case so as to be replaced with new one.

8. An air conditioning system for a car according to claim 1, wherein the temperature door is a plate type door rotating on a rotary shaft formed on the upper end of a door member.

9. An air conditioning system for a car according to claim 1, wherein the temperature door is a sliding door including: a door member having predetermined width and length and being curved in an arc shape; guide pins protruding from upper and lower edges of both sides of the door member; and racks formed along both side ends of the upper surface of the door member and engaging the pinion gears.

10. An air conditioning system for a car according to claim 9, wherein the air conditioning case includes a pair of guide rails formed in an arc shape to which the guide pins of the temperature door are slidably fit and supported.

11. An air conditioning system for a car according to claim 1, wherein the shiftable deodorization filter filters air and a malodor during a predetermined period of time, and then, is returned to its original position, wherein an amount of the air passing through the filter is minimized.

12. An air conditioning system for a car according to claim 3, wherein the driving means is an actuator.

* * * * *